(No Model.) 2 Sheets—Sheet 1.

O. H. BASQUIN.
PRISM LIGHT.

No. 586,220. Patented July 13, 1897.

Witnesses:—
A. R. Appleman
James W. Parker

Inventor:
Oliver H. Basquin

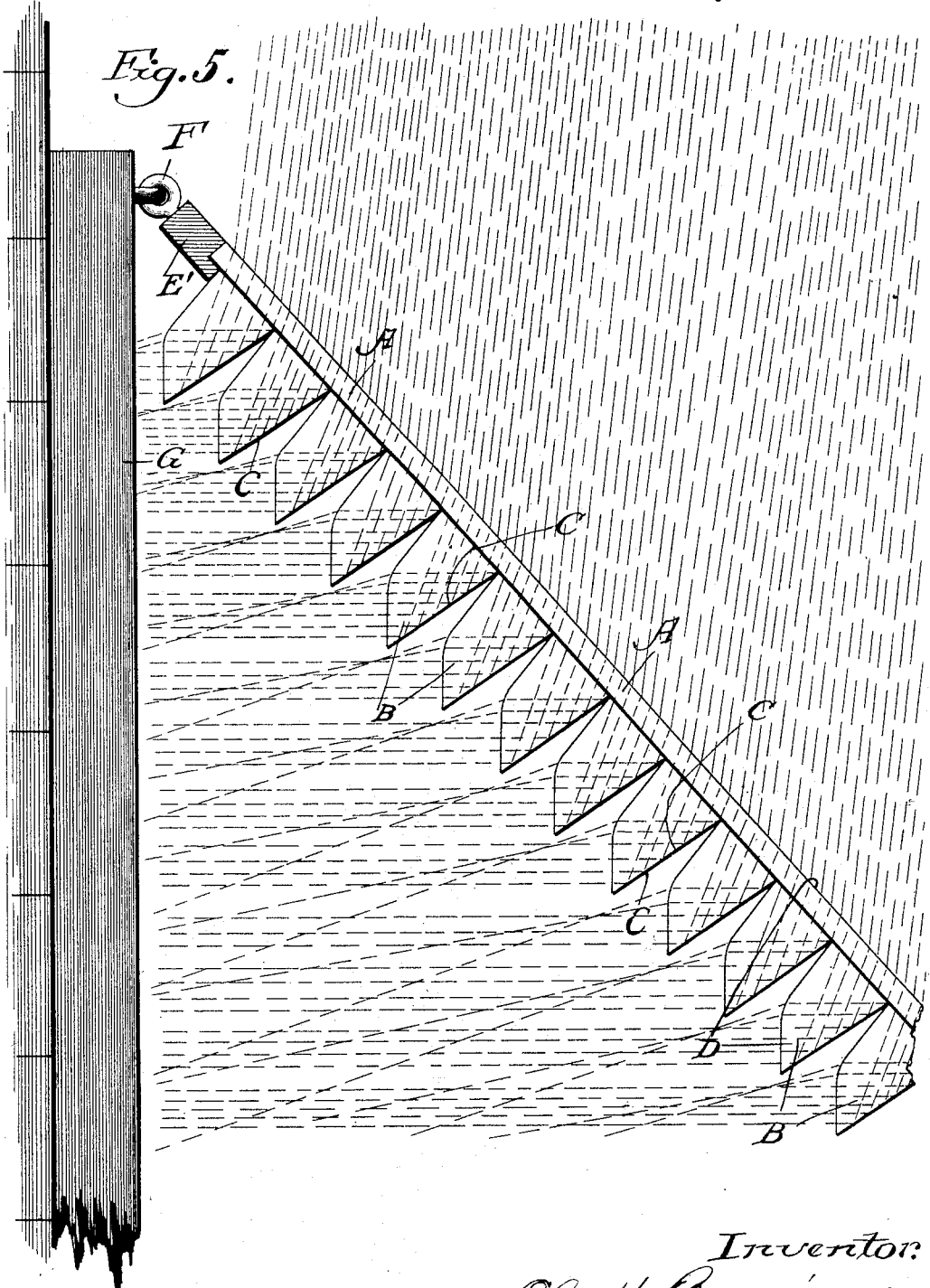

UNITED STATES PATENT OFFICE.

OLIN H. BASQUIN, OF CHICAGO, ILLINOIS, ASSIGNOR TO THE LUXFER PRISM PATENTS COMPANY, OF SAME PLACE.

PRISM-LIGHT.

SPECIFICATION forming part of Letters Patent No. 586,220, dated July 13, 1897.

Application filed March 23, 1897. Serial No. 628,844. (No model.)

*To all whom it may concern:*

Be it known that I, OLIN H. BASQUIN, a citizen of the United States, and a resident of Chicago, in the county of Cook and State of Illinois, have invented certain new and useful Improvements in Prism-Lights, of which the following is a full, clear, and exact description.

My invention relates to prism-lights for receiving and directing light into a room or apartment to be lighted, and has for its object to provide a form of prism-light which, when placed at an inclination to the vertical, will receive and transmit all the light falling upon its receiving-surface from a given direction through the prisms to the other side in such manner that such light will be partly thrown into substantially horizontal lines and the remainder will be converged on a line a little farther from the plane of the receiving-surface than the lower line of such prism and in advance of the lower line of such prism by a distance about equal to the greatest width of such prism in the direction in which the light is to be thrown, but parallel to the plane receiving-surface.

My invention is illustrated in the accompanying drawings, wherein—

Figure 1:
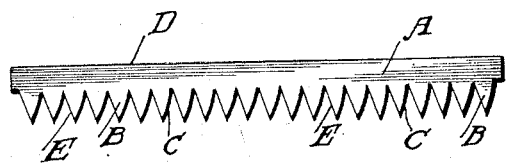
Figure 2:
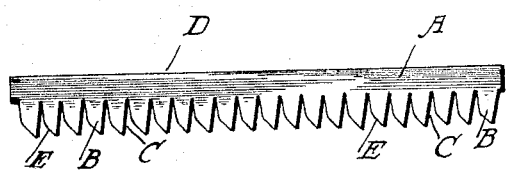
Figure 3:
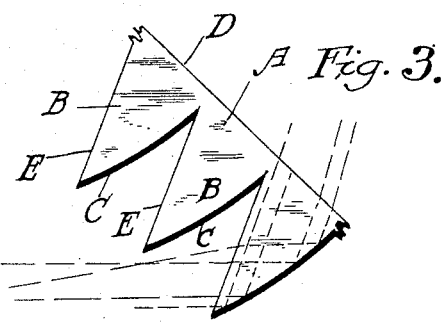
Figure 4:
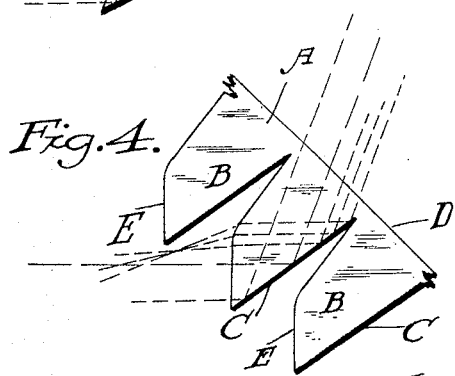

Figure 1 is a view of my prism-plate, each prism having one plane surface and one curved surface. Fig. 2 is a similar view in which the plane and curved surfaces are reversed. Fig. 3 is an enlarged view of the prisms of Fig. 1, and Fig. 4 is an enlarged view of the prisms of Fig. 2. Fig. 5 is an enlarged sectional view of a canopy provided with a series of these prisms, thus illustrating their use and operation. Doubtless there may be other forms of these prisms and both surfaces may be curved so as to get the desired result without departing from the spirit of my invention.

A is the body of the prism-light, having a receiving-surface D and the prisms B B, each having a lower surface C and an upper surface E.

In Figs. 1 and 3 the upper surface E is plane and in Figs. 2 and 4 the upper surface is curved. The passage of the light through these prisms is indicated by the dotted lines, a small quantity of light being converged on a line below the upper prism in Fig. 3 and a considerable quantity of light being converged on each line in Fig. 4. E' is a canopy-frame containing a set of my prisms, and it is preferably hinged at F to the window-frame G. This form of prism-light is peculiarly adapted for canopies and the like, the light being received from above and being thrown by the canopy through an opening beneath into the room to be lighted. Of course it is applicable to light a room of which it forms in part the inclined roof or cover, such as in various forms of skylight-work.

There are various forms of prism-lights which may be placed vertically in a window and which will then project the light into the room in substantially horizontal lines. If such prism-lights be inclined, as indicated in the drawings, they may still throw some light received from a certain direction into the room, but they will throw a certain amount of light against the preceding prism, and in the case of prism-lights intended only to operate by refraction other difficulties and disadvantages arise if they are attempted to be used in a sharply-inclined plane.

I have spoken of my improvement as a "prism-light." Of course it is evident that the invention may be applicable to a set or series of prisms not made integral with each other, as is the case with "prism-lights," as that term is ordinarily used, and, moreover, if desired, the invention can be incorporated in a series of parts more closely approximating what is known as "prism-tiles," such as are used for pavements and the like.

To determine the character and relations of the two faces of the prism, I proceed as follows: Knowing the direction from which the light is to be received and the necessary inclination thereto of the receiving-surface of the prism and knowing the direction in which the light is to be thrown, I may make a diagram containing lines indicating these several directions. I now arbitrarily determine the width of the prism and one face and lay off these dimensions and lines on the diagram in proper relation to the others. Now by drawing lines to diagrammatically represent the rays of light it is observed that the undetermined side of the prism will be produced by joining in a proper manner the large number of short reflecting or refracting surfaces which have been laid down in such position as to take the rays of light from the receiving-point and transmit them in a predetermined direction, the curve or surface line thus formed being obviously such as, coöperating with the arbitrarily-determined surface, will take the light coming from the receiving direction and transmit it through the prism and discharge it into the desired direction. In the case involved in this invention it is always necessary to have a considerable number of such rays of light sent forward parallel to each other or in a horizontal direction, some being at a greater or less distance from the edge of the prism next in advance and the remainder of the rays of light to be carried clear of the edge of the prism next in advance, or, in other words, converging upon a line immediately below the same.

It is obvious that either the thickness or the width of the prism may be chosen arbitrarily, and that either side or face of the prism may also be chosen arbitrarily.

I claim—

1. A prism-light comprising a substantially flat glass part having a receiving-surface on one side and a series of projecting prisms on the other, each prism having one curved surface, the curvature of such surface and the character of the other prism-surface being such that substantially all the rays of light falling upon the receiving-surface from a given direction will be so treated successively by the prism-surfaces as part of them to be directed forward in parallel lines and part of them converged substantially along a line a little farther from the plane of the receiving-surface than the lower line of such prism and in advance of the lower line of such prism by a distance about equal to the greatest width of such prism, in the direction in which the light is to be thrown, but parallel to the plane receiving-surface.

2. A prism-light comprising a flat glass part with a receiving-surface on one side and a series of projecting prisms on the other, each prism having one curved surface and one plane surface, the curvature of such surface and the character of the other prism-surface being such that substantially all the light received from one direction will be so treated successively by the prism-surfaces as part of them to be directed forward in parallel lines and part of them to be converged substantially along a line a little farther from the plane of the receiving-surface than the lower line of such prism and in advance of the lower line of such prism by a distance about equal to the greatest width of such prism, in the direction in which the light is to be thrown, but parallel to the plane receiving-surface.

3. A prism-light comprising a flat glass part with a receiving-surface on one side and a series of projecting prisms on the other, each prism having its two surfaces so shaped and related to each other that substantially all the light received from one direction will be so treated successively by the prism-surfaces as part of them to be directed forward in parallel lines and part of them to be converged substantially along a line a little farther from the plane of the receiving-surface than the lower line of such prism and in advance of the lower line of such prism by a distance about equal to the greatest width of such prism, in the direction in which the light is to be thrown, but parallel to the plane receiving-surface.

OLIN H. BASQUIN.

Witnesses:
F. W. PARKER,
A. R. APPLEMAN, Jr.